Aug. 2, 1960 R. W. HUGHES 2,947,952

HYBRID CIRCUITS

Filed April 8, 1957 3 Sheets-Sheet 1

Inventor
ROBERT W. HUGHES
By Philip M. Bolton
Attorney

Aug. 2, 1960 R. W. HUGHES 2,947,952
HYBRID CIRCUITS
Filed April 8, 1957 3 Sheets-Sheet 2

Inventor
ROBERT W. HUGHES
By Philip M. Bolton
Attorney

Aug. 2, 1960 R. W. HUGHES 2,947,952

HYBRID CIRCUITS

Filed April 8, 1957 3 Sheets-Sheet 3

Inventor
ROBERT W. HUGHES
By Philip M. Bolton
Attorney 2,947,952

HYBRID CIRCUITS

Robert W. Hughes, Mountain Lakes, N.J., assignor to International Telephone and Telegraph Corporation, Nutley, N.J., a corporation of Maryland Filed Apr. 8, 1957, Ser. No. 651,339

6 Claims. (Cl. 333—11)

The present invention relates in general to hybrid circuits and in particular to hybrid circuits for both four-wire and two-wire operations.

Hybrid transformer circuits are commonly used in communication networks, particularly telephone networks, and in connection with these uses it has been a common practice for these circuits to be adapted for four-wire to four-wire connection as well as two-wire to four-wire connection. In the prior art when such a hybrid transformer circuit was being used in the role of a two-wire to four-wire connection, proper hybrid effect was obtained by having a balancing network loop whose load impedance was equal to the two-wire load. When the same circuit was used in a four-wire to four-wire connection, the aforementioned balancing network loop was opened and a different tap on each of the line portions of the primary winding of each transformer was used in order to establish the correct turns ratio to get proper matching. In the usual hybrid transformer design, the line primary winding was provided with approximately 40% extra turns in order to effect the transition from a two-wire operation to a four-wire operation. Although the provision of a hybrid having the capacity to be used with either a two-wire or a four-wire operation was desirable, there were serious objections to the above-described type in that in connection with either operation there had to be provided dormant portions, for instance, the 40% extra and unused turns while the transformer was being used with a two-wire operation, and the open balancing network which was unnecessary when the transformer was being used with a four-wire operation.

It is an object of this invention to provide an improved hybrid circuit for use interchangeably with four-wire or two-wire operation.

It is a further object of this invention to provide a hybrid circuit for use interchangeably with four-wire or two-wire operation in which there are no dormant portions irrespective of whether the hybrid is used for two-wire or four-wire operation.

It is still a further object of this invention to provide a hybrid circuit for use interchangeably with four-wire or two-wire operation which is considerably reduced in cost and size.

In accordance with a main feature of the invention the network windings used when operating from two-wire to four-wire transmission lines are used as the extra turns required when operating from four-wire to four-wire transmission lines.

In accordance with a further feature carrying out the main feature above, the turns ratio of the network windings and the balancing impedance of the balancing network are adapted so that proper hybrid operation is obtained with both the two-wire to four-wire operation and with the four-wire to four-wire operation.

A further feature of the invention is a balancing network whose characteristics are based on a network impedance equal to $$\left(\frac{N_{NP}}{N_{LP}}\right)^2 Z_L$$

where $N_{NP}$ equals the number of turns of net primary winding and $N_{LP}$ equals the number of turns of the line primary winding and $Z_L$ equals the load as seen by the hybrid looking toward the two-wire or either of the four-wire input loads.

A still further feature of the invention is the provision of a switching means to readily couple the network primary windings in series with each other or respectively with their associated line primary windings as either two-wire operation or four-wire operation demands.

The above-mentioned and other features and objects of this invention will become more apparent by reference to the following description of an embodiment thereof taken in conjunction with the accompanying drawings, in which.

Figure 1:
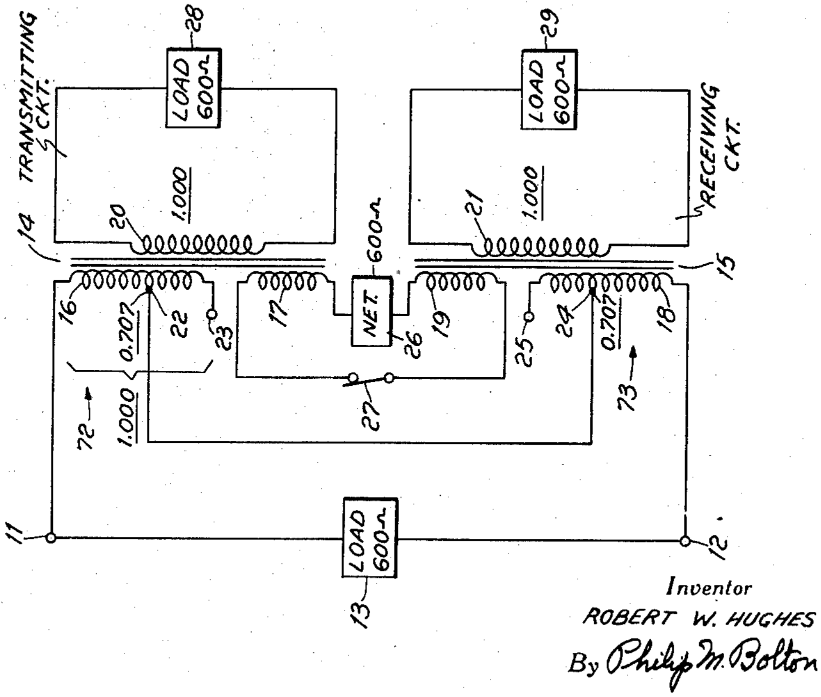
Fig. 1 (PRIOR ART)
Fig. 1 is a schematic drawing of a prior art hybrid circuit for use in two-wire operation.

In Fig. 1 there is shown a prior art hybrid circuit having two input terminals 11 and 12 for use with two-wire operation, across which there is connected a load 13. A pair of transformers 14 and 15 are shown respectively having a pair of primary windings 16, 17, and 18, 19, and each respectively having a secondary winding 20 and 21. Primary winding 16 has a tap 22 at the 70.7% turns point and an end connection 23, while primary winding 18 has a tap 24 at the 70.7% turns point and an end connection 25. There is a balancing network impedance 26 coupled to the two primary windings 17 and 19 which are in turn coupled through switch 27 to form a balancing network group. There is a transmitting circuit load 28 coupled to the secondary winding 20 and a receiving circuit load 29 coupled to the secondary winding 21.

Figure 2:
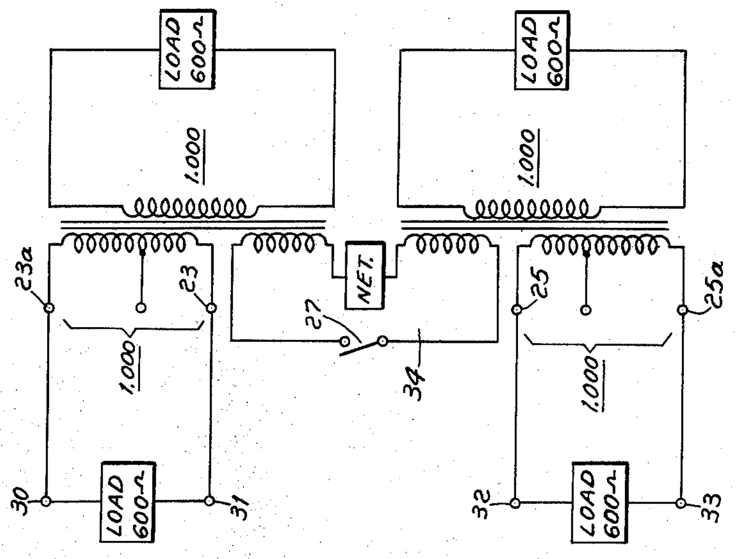
Fig. 2 (PRIOR ART)
Fig. 2 is a schematic drawing showing the prior art hybrid circuit for use in four-wire operation.

In Fig. 2 there is shown the prior art hybrid of Fig. 1 being used in four-wire operation. The end connections 23 and 23*a* are now connected with one pair of the four-wire line terminals 30 and 31 and the end connections 25 and 25*a* are connected to the other pair of the four-wire line terminals 32 and 33. The switch 27 is open to effect the removal of the balancing network loop 34 from the operation.

Figure 3:
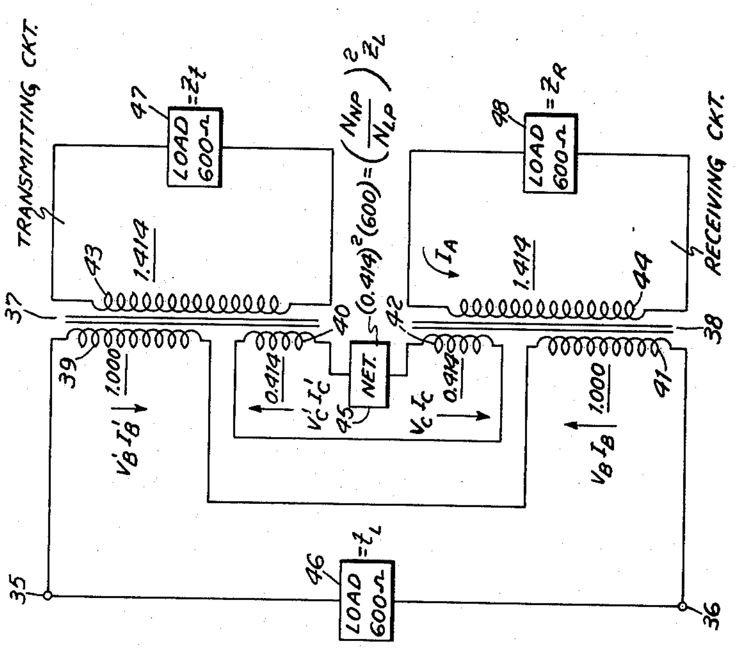
Fig. 3 is a schematic drawing of a hybrid circuit according to the present invention, for use in two-wire operation.

In Fig. 3 there is shown the hybrid circuit according to the present invention with a pair of two-wire line terminals 35 and 36. The two transformers 37 and 38 each respectively have a line and network primary winding 39, 40 and 41, 42. Each transformer 37 and 38 respectively has a secondary winding 43 and 44. The network primary windings 40 and 42 are coupled serially to each other through a balancing network impedance 45. There is a load 46 of 600 ohms across the two wire line terminals 35 and 36 which is identified as $Z_L$ for purposes of the impedance value determination below. A pair of loads 47 and 48 are respectively connected across the transmitting circuit secondary winding 43 and the receiving circuit secondary winding 44, these loads being respectively identified as $Z_t$ and $Z_r$.

Figure 4:
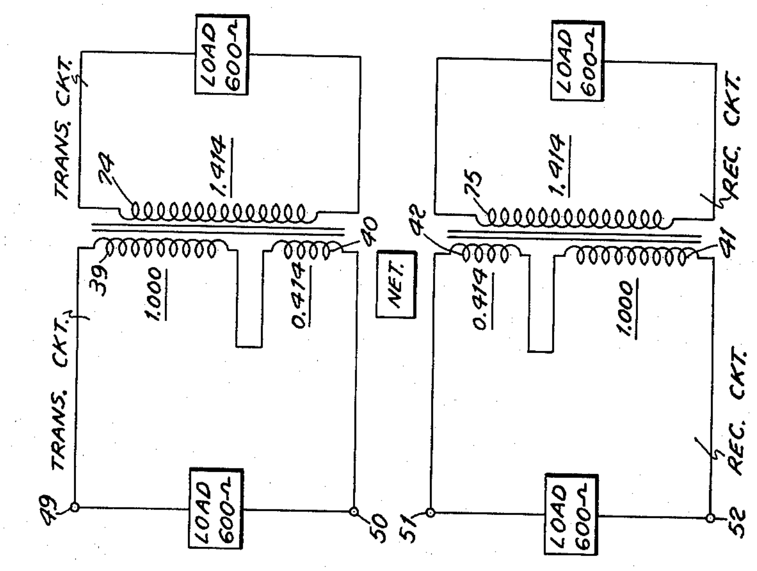
Fig. 4 is a schematic drawing of the hybrid circuit according to the present invention, for use in four-wire operation.

Fig. 4 shows the hybrid circuit according to the present invention in four-wire operation. The line and network primary windings 39 and 40 are coupled serially to a pair of four-wire terminals 49 and 50; and the line and network windings 42 and 41 are coupled to the other pair of the four-wire terminals 51 and 52.

Figure 5:
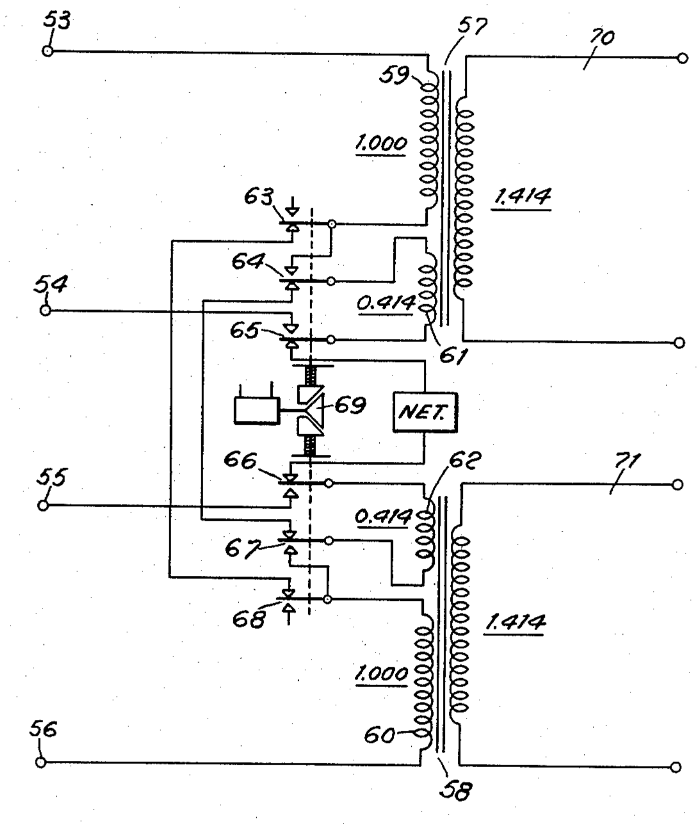
Fig. 5 is a schematic drawing of a preferred embodiment of a hybrid circuit according to the present invention with switching means to effect the conditions shown in Figs. 3 and 4.

Fig. 5 shows the preferred embodiment of the hybrid circuit according to the present invention including the switching means. Four-wire terminals 53, 54, 55 and 56 are shown with the line terminals 53 and 56 being adapted for use in a two-wire operation and the pairs of terminals 53, 54 and 55, 56 being adapted for use in four-wire operation. The two transformers 57 and 58 each respectively have line primary windings 59 and 60 and network primary windings 61 and 62. These primary windings are coupled to a plurality of switching arms 63, 64, 65, 66, 67 and 68. The plurality of switching arms are adapted for being transferred by the movement of the plunger 69. The transmitting circuit loop 70 and the receiving circuit 71 are the counterparts of the transmitting and receiving circuit loops described in connection with the other figures.

Assume the load 13 on the two-wire line is 600 ohms and the loads 28 and 29 on the transmitting and receiving circuits are each 600 ohms. If the power dissipation is equally divided across the 70.7% portions 72 and 73, then in order to obtain proper matching, the secondary windings 20 and 21 must have 100% turns in order to satisfy the inherent transformer condition which dictates that the impedance ratio is equal to the square of the turns ratio. The turns values are signified by numbers that are underlined both on the drawing and the disclosure. It follows that if the hybrid circuit is to be used for four-wire operation as shown in Fig. 2, that proper matching is obtained by opening the switch 27 and connecting the end connections 23 and 23*a* as well as 25 and 25*a*.

Fig. 3 shows the hybrid circuit according to the present invention used in two-wire operation. Assuming that the line primary winding 39 has turns equal to a reference 1, then the turns on the transmitting circuit winding must be 1.414 in order to satisfy the aforementioned transformer equation which declares that the impedance ratio equals the square of the turns ratio, since it is obvious from Fig. 3 that 300 ohms impedances would be seen across 39 and 41 and a 600 ohm impedance across 43 and 44. If the hybrid circuit is to be used with a four-wire operation, as shown in Fig. 4, then there will be 1.414 turns across the combined primary windings 39 and 40 as well as the combined primary windings 42 and 41 facing respectively 1.414 turns across the secondary windings 74 and 75. It becomes clear that as the extra turns necessary for the four-wire operation are to be used as the balancing network turns in the two-wire operations that the balancing network turns will be .414 as shown at 40 and 42 of Fig. 3. In order to use the balancing network with the .414 turns successfully, the impedance of the network must be properly determined to account for the changed turns ratio. Such a determination taken in conjunction with the notation of Fig. 3 and Fig. 4 can be accomplished as follows:

According to the general transformer equation (and the notation on Fig. 3), $$\frac{Z_B}{Z_A}=\left(\frac{N_B}{N_A}\right)^2 \tag{1}$$

$$\frac{V_A}{N_A}=\frac{V_B}{N_B}=\frac{V_C}{N_C}=\frac{V_B'}{N_B'}=-\frac{V_C'}{N_C'} \tag{2}$$

where N=turns for the hybrid effect:

$$I_B'N_B'=I_C'N_C' \tag{3}$$

rearranging 2 and 3:

$$\frac{N_B'}{N_C'}=\frac{I_C'}{I_B'}=\frac{V_B'}{V_C'} \tag{4}$$

therefore:

$$V_C'L_C'=V_B'I_B'=V_BI_B=V_CI_C \tag{5}$$

since $$Z_{net}=\frac{V_{net}}{I_C} \tag{6}$$

and $$V_{net}=V_C+V_{C'}=2V_C \tag{7}$$

then $$Z_{net}=\frac{2V_C}{I_C} \tag{8}$$

by observation $$Z_L=2Z_B=\frac{2V_B}{I_B} \tag{9}$$

substituting from 9 for $Z_B$ into 1 then:

$$\sqrt{\frac{\frac{Z_L}{2}}{Z_A}}=\frac{N_B}{N_A}=\left(\sqrt{\frac{1}{2}}\right)\left(\sqrt{\frac{Z_L}{Z_A}}\right) \tag{10}$$

for a 4 wire operation by observation $$\sqrt{\frac{Z_L}{Z_A}}=\frac{N_B+N_C}{N_A} \tag{11}$$

substituting 11 in 10

$$\frac{N_B}{N_A}=\left(\sqrt{\frac{1}{2}}\right)\left(\frac{N_B+N_C}{N_A}\right) \tag{12}$$

Cancelling $N_A$ and solving for $N_C$:

$$N_C=\frac{\left(1-\sqrt{\frac{1}{2}}\right)}{\sqrt{\frac{1}{2}}}N_B \tag{13}$$

from 4 and 13

$$V_C=\frac{N_CV_B}{N_B}=\frac{V_B\left(1-\sqrt{\frac{1}{2}}\right)N_B}{\sqrt{\frac{1}{2}}N_B}=\left[\frac{1-\sqrt{\frac{1}{2}}}{\sqrt{\frac{1}{2}}}\right]V_B \tag{14}$$

from 5 and 14

$$I_C=\frac{V_BI_B}{V_C}=\frac{V_BI_B}{V_B\left[\frac{1-\sqrt{\frac{1}{2}}}{\sqrt{\frac{1}{2}}}\right]} \tag{15}$$

substituting for $V_C$ and $I_C$ in 8 from 14 and 15

$$Z_{net}=\frac{(2)(V_B)\left[\frac{1-\sqrt{\frac{1}{2}}}{\sqrt{\frac{1}{2}}}\right]^2}{I_B} \tag{16}$$

substituting 9 in 16

$$Z_{net}=\left[\frac{1-\sqrt{\frac{1}{2}}}{\sqrt{\frac{1}{2}}}\right]^2Z_L=(.414)^2Z_L \tag{17}$$

or from 2 and 3 substituting for $V_C$ and $I_C$ in 8

$$Z_{net}=(2)\frac{\frac{V_BN_C}{N_B}}{\frac{N_BI_B}{N_C}}=\frac{2V_B}{I_B}\left(\frac{N_C}{N_B}\right)^2= \tag{18}$$

from Equation 9 substitute in 18

$$Z_{net}=\left(\frac{N_C}{N_B}\right)^2Z_L \tag{19}$$

If $N_C$ equals turns of the net primary and $N_B$ turns of the line primary and $Z_L$ the load across either the two wire or either of the four wire pairs then:

$$Z_{net}=\left(\frac{N_{NP}}{N_{LP}}\right)^2 Z_L \qquad (20)$$

where $N_{NP}$=number of turns of net primary
$N_{LP}$=number of turns of line primary If the loads at 46, 47 and 48 are 600 ohms as shown in Fig. 3, then the impedance of the net 45 will be equal to $(.414)^2$ (600) as determined above and as shown on Fig. 3.

While the proof and the above result have been determined in accordance with Fig. 3, which shows a load on the transmitting and receiving circuit equal to 600 ohms or $Z_L$, the secondary winding could be designed to accommodate a load not equal to $Z_L$ and the network impedance would be the same as determined above by Equation 20.

In Fig. 5 if the three movable arms 63, 64 and 65 are moved vertically downward, then the windings 59 and 61 are coupled in the same fashion as are the windings 39 and 40 of Fig. 3. If the arms 63, 64 and 65 are moved vertically upward, then the primary windings 59 and 60 are coupled in the same fashion as are the windings 39 and 40 of Fig. 4. The switching arms 66, 67 and 68 perform the similar action on the lower half of the hybrid to effect in cooperation with the switching arms 63, 64 and 65 the transition between the conditions of the hybrid circuit as shown on Figs. 3 and 4.

While I have described above the principles of my invention in connection with specific apparatus, it is to be clearly understood that this description is made only by way of example and not as a limitation to the scope of my invention as set forth in the objects thereof and in the accompanying claims.

I claim:

1. A hybrid circuit for associating interchangeably a four-wire transmission line or a two-wire transmission line with a pair of two-wire receiving and transmitting circuits comprising a first and second transformer each having a first and second primary winding in series aiding relationship and each having a secondary winding, each of said secondary windings adapted to be respectively coupled to said receiving and transmitting circuits, means for serially coupling each of said first primary windings to each other, and simultaneously coupling said second primary windings serially with each other to form a balancing network loop for use with said two-wire transmission line arrangement, and means for alternatively serially coupling each of said first primary windings to its associated second primary winding for use with said four-wire transmission line arrangement, the relative turns ratio of the first and second primary winding of each transformer being substantially 1 to 0.414, and said secondary winding of said transformer having a turns ratio to one of its primary windings of 1.414, all of said windings being of like polarity respectively.

2. A hybrid circuit according to claim 1, further including a switching means to effect said coupling of said first and second primary windings for use with each of said two-wire and said four-wire line combinations.

3. A hybrid circuit according to claim 1, wherein the impedance of said balancing network loop equals $$\left(\frac{N_{NP}}{N_{LP}}\right)^2 Z_L$$

where $N_{LP}$ equals the number of turns of each of said first primary windings, wherein $N_{NP}$ equals the number of turns of each of said second primary windings and where $Z_L$ equals the load to be seen respectively from said secondary windings when looking toward said two-wire transmission line or either of said four-wire transmission lines.

4. A hybrid circuit for associating interchangeably a four-wire transmission line or a two-wire transmission line with a pair of two-wire receiving and transmitting circuits comprising four-transmission line terminals for use with a four-wire transmission line, two of said transmission line terminals adapted to be used with a two-wire transmission line, a balancing network, a pair of receiving circuit terminals, a pair of transmitting circuit terminals, a first transformer having a secondary winding coupled to said receiving circuit terminals, a second transformer having a secondary winding coupled to said transmitting circuit terminals, said first and second transformers each having a network primary winding and a line primary winding in series aiding relationship, a switching arrangement having two operational positions, a first circuit coupling through said switching arrangement in its first position said two-wire transmission line terminals to both of said line primary windings in series and simultaneously coupling both of said network primary windings to said balancing network to form a loop, a second circuit coupling in series through said switching arrangement in its second position, a first pair of said four-wire transmission line terminals to said first transformer line primary winding and its network primary winding, and a third-circuit coupling in series through said switching arrangement in its second position a second pair of said four-wire transmission line terminals to said second transformer line primary winding and its network primary winding, the relative turns ratio of said line primary winding and said network primary winding of the transformers being substantially 1 to 0.414 and the turns ratio of the secondary windings to the line windings being substantially 1.414, all of said windings being of like polarity respectively.

5. A hybrid circuit for associating interchangeably a four-wire transmission line and a two-wire transmission line with a pair of two-wire receiving and transmitting circuits wherein the load of the four-wire transmission line combination and the load on the two-wire transmission line combination are equal to each other and equal to the load on each of the receiver and transmitting circuits comprising four-wire transmission line terminals for use with a four-wire transmission line, two of said transmission line terminals adapted to be used with a two-wire transmission line, a first transformer having a secondary winding with the $\sqrt{2}$N turns coupled to said receiving circuit terminals, a second transformer having a secondary winding with the $\sqrt{2}$N turns coupled to said transmitting circuit terminals, said first transformer having a network primary winding of $(\sqrt{2}-1)$ N turns and a line primary winding of N turns in series aiding relationship, a second transformer having a network primary winding of $(\sqrt{2}-1)$ N turns and a line primary winding of N turns in series aiding relationship, a balance network whose impedance equals $(\sqrt{2}-1)^2$ times said load, a switching arrangement having two operation positions, a first circuit coupling through said switching arrangement in its first position, said two-wire transmission line terminals to both of said line primary windings in series and simultaneously coupling both of said network primary windings to said balancing network to form a loop, a second circuit coupling in series through said switching arrangement in its second position a first pair of said four-wire transmission line terminals to said first transformer line primary winding and network primary winding, and a third-circuit coupling in series through said switching arrangement a second pair of said four-wire transmission line terminals to said second transformer line primary winding and network primary winding, all of said windings being of like polarity respectively.

6. A hybrid transmission circuit for associating interchangeably a four-wire transmission line or a two-wire transmission line with a pair of two-wire receiving and transmitting circuits comprising a first and second transformer each having a first and second primary winding in series aiding relationship and each having a secondary winding, said first and second primary windings having respectively a turns ratio one to the other of 1.000 to .414 and said secondary winding having a turns ratio to its associated primary winding of 1.414, each of said secondary windings adapted to be respectively coupled to said receiving and transmitting circuits, means for serially coupling each of said first primary windings to each other, and simultaneously coupling said second primary windings serially with each other to form a balancing network loop for use with said two-wire transmission line arrangement, and means for alternatively serially coupling each of said first primary windings to its associated second primary winding for use with said four-wire transmission line arrangement, all of said windings being of like polarity respectively.

References Cited in the file of this patent

FOREIGN PATENTS 537,203 France ---------------- May 18, 1922